United States Patent
Populus et al.

(10) Patent No.: US 9,262,927 B2
(45) Date of Patent: Feb. 16, 2016

(54) METHOD AND DEVICE FOR AUTOMATICALLY MANAGING AUDIO AIR CONTROL MESSAGES ON AN AIRCRAFT

(71) Applicant: AIRBUS OPERATIONS S.A.S., Toulouse (FR)

(72) Inventors: Frédérique Populus, Fontenilles (FR); Eric Petit, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 0 days.

(21) Appl. No.: 14/488,562

(22) Filed: Sep. 17, 2014

(65) Prior Publication Data
US 2015/0081292 A1    Mar. 19, 2015

(30) Foreign Application Priority Data
Sep. 18, 2013   (FR) ...................................... 13 58977

(51) Int. Cl.
G08G 5/00    (2006.01)
G10L 15/26   (2006.01)
G06F 17/27   (2006.01)

(52) U.S. Cl.
CPC ............ *G08G 5/0004* (2013.01); *G06F 17/277* (2013.01); *G08G 5/0013* (2013.01); *G08G 5/0021* (2013.01); *G08G 5/0052* (2013.01); *G08G 5/0095* (2013.01); *G10L 15/26* (2013.01)

(58) Field of Classification Search
CPC ... G08G 5/0008; G08G 5/0013; G08G 5/003; G08G 5/0047; G08G 5/0069; G10L 15/26
See application file for complete search history.

(56) References Cited

U.S. PATENT DOCUMENTS

| 6,044,322 | A  | * | 3/2000 | Stieler ..................... G01S 13/91 342/36 |
| 6,282,417 | B1 |   | 8/2001 | Ward |
| 6,356,228 | B1 | * | 3/2002 | Tomita .................... G01S 7/003 342/175 |
| 7,177,731 | B2 |   | 2/2007 | Sandell et al. |
| 7,733,903 | B2 |   | 6/2010 | Bhogal et al. |
| 7,809,405 | B1 | * | 10/2010 | Rand .................... G08G 5/0013 455/431 |
| 8,164,487 | B1 | * | 4/2012 | Tsai ....................... G01C 23/00 340/574 |

(Continued)

FOREIGN PATENT DOCUMENTS

FR         2913799  A1    9/2008

OTHER PUBLICATIONS

Kopald, Hunter D., et al. "Applying automatic speech recognition technology to air traffic management." Digital Avionics Systems Conference (DASC), 2013 IEEE/AIAA 32nd. IEEE, 2013.*

(Continued)

*Primary Examiner* — Matthew Baker
(74) *Attorney, Agent, or Firm* — Ingrassia, Fisher & Lorenz, P.C.

(57) ABSTRACT

Methods and devices for automatically managing audio air control messages on an aircraft are described. The device comprises a unit for automatically transcribing an audio message received on board an aircraft into a textual message, a unit for automatically processing the textual message in order to extract all the indications included in this message, and a unit for automatically displaying, for each extracted indication, on at least one screen of the aircraft cockpit, an information message relating to the indication and a validation request for the pilot.

20 Claims, 3 Drawing Sheets

(56) References Cited

U.S. PATENT DOCUMENTS

| | | | |
|---|---|---|---|
| 8,195,459 B1* | 6/2012 | Brand | G06F 17/30705 704/231 |
| 8,306,675 B2 | 11/2012 | Prus et al. | |
| 8,704,701 B2* | 4/2014 | Pschierer | G08G 5/0013 342/182 |
| 8,723,686 B1* | 5/2014 | Murray | G08G 5/0021 340/901 |
| 2003/0016160 A1* | 1/2003 | Lok | G08G 5/025 342/33 |
| 2006/0046715 A1* | 3/2006 | Burgemeister | H04B 7/18506 455/431 |
| 2007/0215745 A1 | 9/2007 | Fleury et al. | |
| 2008/0039988 A1* | 2/2008 | Estabrook | B64C 13/18 701/14 |
| 2008/0114504 A1* | 5/2008 | Goodman | G08G 5/0013 701/3 |
| 2010/0277347 A1* | 11/2010 | Judd | G08G 5/0021 340/945 |
| 2011/0291861 A1 | 12/2011 | Meunier et al. | |
| 2013/0346081 A1* | 12/2013 | Loubiere | G08G 5/0013 704/260 |
| 2014/0172194 A1* | 6/2014 | Levien | G08G 5/0091 701/2 |

OTHER PUBLICATIONS

Jensen, Randy, Richard Stottler, and Bonnie Schwartz. Automated Probabilistic Analysis of Air Traffic Control Communications. Stottler Henke Associates Inc San Mateo CA, 2013.*

Cordero, José Manuel, Manuel Dorado, and José Miguel de Pablo. "Automated speech recognition in ATC environment." Proceedings of the 2nd International Conference on Application and Theory of Automation in Command and Control Systems. IRIT Press, 2012.*

French Patent and Trademark Office, French Search Report for Application No. 1358977 mailed Jun. 11, 2014.

* cited by examiner

METHOD AND DEVICE FOR AUTOMATICALLY MANAGING AUDIO AIR CONTROL MESSAGES ON AN AIRCRAFT

CROSS-REFERENCE TO RELATED APPLICATION

This application claims priority to French Patent Application No. 13 58977, filed Sep. 18, 2013, which is incorporated herein by reference in its entirety.

TECHNICAL FIELD

The present invention relates to audio communication between the air traffic control (ATC) on the ground and an aircraft, in particular a transport aircraft, and more precisely to the management of audio air traffic control messages transmitted by a transmitter on the ground from an air traffic controller and received on board the aircraft by means of at least one radio-communication unit. An audio air traffic control message generally comprises instructions that have to be executed on the aircraft and/or information that has to be communicated to a pilot of the aircraft.

BACKGROUND

Usually, air traffic control is divided into zones referenced on a navigation chart. According to the position of the aircraft, the flight of the aircraft is managed by the controller dedicated to the zone in which the aircraft is situated. For its communication, the air traffic control transmits on one or more frequencies. The pilot of an aircraft, when he enters a new zone (or before entering therein if the previous controller so requests of him), tunes one of the communication channels of his radio-communication means (radio) to the corresponding frequency in order to indicate his entry into the zone and optionally his intentions (flight plan, etc.) to the control on the ground, namely either to a control tower if the zone is close to an airport or to an ATC centre controlling a wider area.

Conventionally, the pilot must listen to all the ATC messages that are transmitted on the frequency that he has selected and are intended for all the aircraft connected to this frequency. The pilot must identify, among the messages listened to, those that are intended for him (that is to say that comprise the call sign of his aircraft). When he detects an audio message that is intended for him, he must understand the instructions contained in the audio message, execute them and read them back. The readback must be done immediately or at least after a short time, otherwise the air traffic controller repeats his message. If the pilot is unable to execute it immediately, he must inform the air traffic controller of this. The audio acknowledgement allows the air traffic controller to detect any errors in understanding on the part of the pilot. In this eventuality, the air traffic controller will repeat his message until he obtains a correct readback.

This conventional method of managing audio air traffic control messages on board an aircraft presents a high workload for the pilots of the aircraft. Accordingly, there is a need for improved methods for the automatic management of audio air traffic control messages on board an aircraft that reduce the workload on the pilots of the aircraft. In addition, other objects, desirable features, and characteristics will become apparent from the subsequent summary and detailed description, and the appended claims, taken in conjunction with the accompanying drawings and this background.

SUMMARY

In accordance with one embodiment, a method is provided for automatically managing audio air traffic control messages on board an aircraft transmitted by a transmitter of an air traffic controller and received on board the aircraft by means of at least one radio-communication unit. An audio message comprises at least one indication intended for the aircraft and corresponding to one of the following indications: an instruction that has to be executed on the aircraft and information that is to be communicated to a pilot of the aircraft. The method is implemented automatically and successively, when an audio message is received on board the aircraft by the radio-communication unit, and includes: (a) transcribing the audio message received into a textual message; (b) checking that the audio message received is intended for said aircraft; (c) if it is intended for the aircraft, processing the textual message corresponding to the audio message so as to extract all the indications contained in said audio message; and (d) for each of the indications thus extracted, displaying, on at least one screen in the aircraft cockpit, an information message relating to the indication and a request for validation by the pilot.

Thus, by virtue of the various embodiments, the audio air traffic control messages are managed automatically and, for each of the indications (instructions or information) contained in a given audio message, a corresponding information message is displayed on a screen in the cockpit, to inform the pilots of the indication (then to implement it after validation as stated below), which relieves the pilots of numerous habitual tasks and thus reduces their workload.

Advantageously, step (c) above comprises successive sub-steps consisting respectively of: (c1) analysing the textual message, first of all by lexical analysis and then by syntactic analysis, so as to extract the indications contained in said textual message; and (c2) identifying: for each instruction extracted, at least one system of the aircraft configured to execute this instruction; and for each item of information extracted, at least one display unit of the aircraft configured to display this information.

In addition, advantageously, step (d) comprises operations consisting, for an indication corresponding to an instruction, of: displaying the instruction that is to be executed by a system of the aircraft and a request for validation of the execution of this instruction by this system; and in the event of validation by the pilot, activating the system so that it executes this instruction, and optionally cancelling the display of the instruction.

Furthermore, advantageously, step (d) comprises operations consisting, for an indication corresponding to an item of information, of: displaying the information and a request for validation of the reading of this information by the pilot; and in the event of validation by the pilot, optionally cancelling the display of the information.

Moreover, in a particular embodiment, if at sub-step (c2) it is impossible to determine a system that is to execute an instruction, an information message indicating that this is impossible is displayed on at least one screen in the aircraft cockpit.

In addition, advantageously, step (c) comprises at least one operation of consolidating an indication according to at least one of the following consolidation elements: a context of the aircraft and a location of the aircraft, the consolidation operation consisting of checking the validity of the indication according to at least one consolidation element; and in the event of a problem with validity vis-à-vis the consolidation element, checking the presence or absence of an inconsistency in the indication with respect to the consolidation element, and: in the event of absence of inconsistency, correcting the indication; and in the event of inconsistency being present, displaying a message of inability to interpret the indication.

In addition, preferably, in order to correct the indication, the consolidation operation comprises the following sub-steps, consisting of: proposing a correction of the indication to the pilot; requesting validation of the correction proposed; and correcting the indication after validation by the pilot, in accordance with the correction proposed.

Furthermore, in a particular variant, in order to check the validity of the indication, the value of a variable element of the indication is compared with a current value of this element.

Moreover, in a particular embodiment, step (b) above comprises successive sub-steps, consisting respectively of: determining at least one first frequency corresponding to a listening frequency of the radio-communication unit, at which it received the audio message; determining the current geographical position of the aircraft; from the current geographical position of the aircraft and a database comprising frequencies of transmitters of audio air traffic control messages associated with geographical positions, determining a set of frequencies associated with a zone in which the current geographical position of the aircraft is situated; and comparing the first frequency with each of the frequencies in the set of frequencies and, if the first frequency is identical to one of the frequencies in the set of frequencies, deducing from this that the audio message is liable to be intended for the aircraft.

In this particular embodiment, step (b) comprises supplementary successive sub-steps, consisting respectively, if the audio message is liable to be intended for the aircraft, said aircraft being designated by a first code, of: extracting from the audio message a string of characters representing a second code; comparing the second code thus extracted with the first code designating the aircraft; and determining that the audio message is intended for the aircraft if the first and second codes are identical.

The present disclosure also concerns a device for the automatic management of audio air traffic control messages on board on aircraft, transmitted by a transmitter of an air traffic controller and received on board the aircraft by means of a radio-communication unit.

According to one embodiment, the automatic management device comprises: a reception unit configured to automatically capture any audio message received by the radio-communication unit; a transcription unit configured to automatically transcribe an audio message captured by the reception unit into a textual message; a verification unit configured so as to automatically check whether the audio message received by means of the radio-communication unit is intended for the aircraft; a processing unit configured to automatically process the textual message corresponding to the audio message so as to extract all the indications contained in said audio message, and at least one display unit configured so as to automatically display, for each of the indications extracted, on at least one screen in the aircraft cockpit, an information message relating to the indication and a request for validation by the pilot. Advantageously, at least said reception unit, said transcription unit, said verification unit and said processing unit form part of a central unit.

Furthermore, in a particular embodiment, the automatic management device also comprises a data transmission unit configured to transmit, after validation by the pilot, an execution order (to a system of the aircraft) ordering the execution of an instruction by said system, and/or a display order (to a screen in the aircraft cockpit) ordering the display of an item of information by said screen.

Moreover, in a particular embodiment, the automatic management device also comprises at least one of the following elements: at least one database comprising frequencies of transmitters of audio air traffic control messages associated with geographical positions; at least one database comprising data for performing a lexical analysis and a syntactic analysis of a textual message; and a unit for determining the current position of the aircraft.

Furthermore, advantageously, the automatic management device also comprises a validation unit configured to allow a pilot to validate the execution of an instruction by a system and/or the reading of an item of information. Advantageously, said validation unit comprises a touch screen, a validation request being displayed on a touch-sensitive window on the touch screen, the validation being implemented by a contact on this touch-sensitive window of the touch screen.

The present disclosure also concerns an aircraft, in particular a transport aircraft, that is equipped with an automatic management device as aforementioned.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
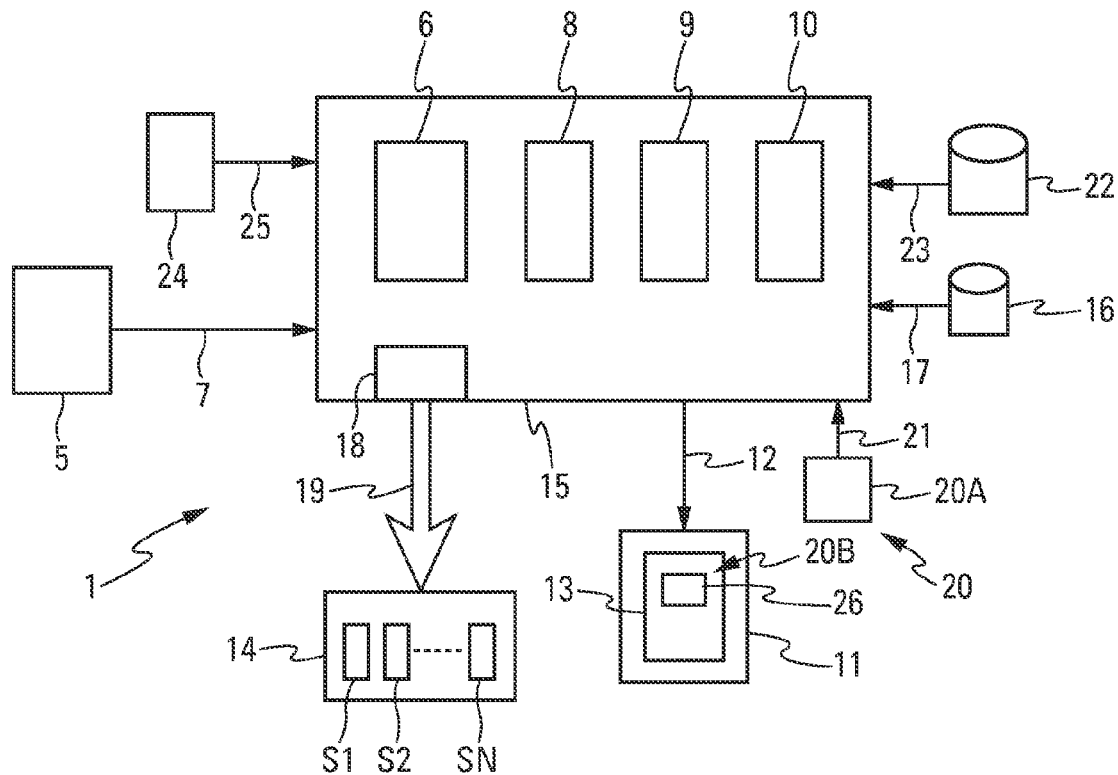
FIG. 1 is the block diagram of an automatic management device illustrating an embodiment.

FIG. 1 schematically depicts a device 1 for automatically managing audio air traffic control messages on board an aircraft AC, in particular, a transport aircraft.

Figure 2:
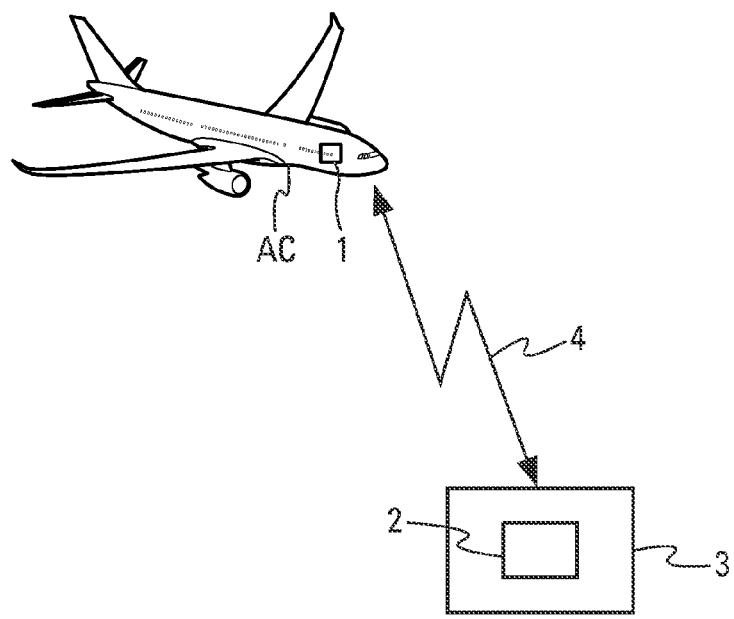
FIG. 2 shows schematically in perspective an aircraft to which the present description can be applied.

Conventionally, as depicted schematically in FIG. 2, the audio air traffic control messages are generated and transmitted by a transmitter 2 of an air traffic control station 3 installed on the ground at a particular transmission frequency. These messages are transmitted via electromagnetic waves, as illustrated by an arrow 4 in FIG. 2, and are received on board the aircraft AC by means of a conventional radio-communication unit 5 (or radio) (FIG. 1) tuned to this transmission frequency.

In general, an audio air traffic control message comprises instructions that are to be executed on the aircraft AC and/or information that is to be communicated to a pilot of the aircraft AC. In the context of the present disclosure, such an instruction or information is referred to as an "indication".

An example of an audio message is presented below. In this example, the control on the ground (in this case "the control tower of Blagnac airport") addresses an aircraft AC identified by an identifier (or code) which is "A222", via the following audio message: "A222, Blagnac tower, climb to flight level 15". The pilot in response must confirm the reception of the audio message by means of the following message: "Climb to flight level 15, A222".

Sometimes the ground control does not give its code (namely "Blagnac tower" in the previous example). Thus, for the same message sent, said message in that case contains only the code of the aircraft AC: "A222, climb to flight level 15".

An ATC message therefore generally comprises: a first obligatory code (or identifier) ("A222") designating the aircraft AC to which the indications contained in the ATC message are intended; a second code ("Blagnac tower") relating to the source of the ATC message, this second code (or identifier) being optional; and a set of indications, these indications being able to be of a greater or lesser complexity and to contain one (as in the previous example) or more instructions or items of information to be transmitted.

The instructions contained in an ATC message may be to be executed: simultaneously, for example two instructions requesting the pilots of the aircraft AC, respectively, to fly directly to a waypoint and to maintain the current speed of the aircraft AC; or one after the other (conditional instruction), the execution of a second instruction being dependent on the end of the execution of a first instruction, for example two instructions requesting the pilots of the aircraft AC to fly directly to a given waypoint and then to climb to a given flight level; or in a deferred manner, for example an instruction requesting the pilot to change communication frequency must be executed when the aircraft enters an appropriate zone.

The ATC audio messages do not routinely give rise to actions by the pilot or pilots for modifying flight parameters. They may also contain messages of an informative character, questions or messages warning the crew of a probable change in situation (for example a change in runway) that may potentially lead to actions to be performed.

The ATC messages are codified and structured according to a well-defined and regulated phraseology. These messages may include an additional free message part, because of the oral character of the transmission and the use of spoken language. However, the basic structure of the regulatory phraseology remains applied.

Audio ATC messages may be communicated either in the language spoken on the ground when the crew of the aircraft speaks this language (for example: "A222, climb to flight level 15" addressed in France to a crew speaking French), or in English in all other cases.

According to various embodiments, in order to effect automatic management of audio messages of the ATC type, as presented above, said device 1, which is installed on the aircraft AC, comprises, as depicted in FIG. 1: a reception unit 6 that is connected by means of a link 7 to the radio-communication unit 5 and is configured to capture, automatically, any audio message received by the radio-communication unit 5; a transcription unit 8 that is configured to automatically transcribe, in the conventional fashion, in real time, an audio message captured by the reception unit 6, into a textual message. The "voice-to-text" transcription used by the transcription unit 8 also identifies silences, via an analysis of the pauses and intonations at the end of a sentence; a verification unit 9 that is configured to automatically check whether the audio message received by means of the radio-communication unit 5 is intended for the aircraft AC; a processing unit 10 that is configured to automatically process the textual message transmitted by the transcription unit 8 and corresponding to an audio message received, so as to extract all the indications contained in said message; and at least one display unit 11 that is connected by means of a link 12 to the processing unit 10 and is configured to automatically display, for each of the indications extracted by the processing unit 10, on at least one screen 13 in the cockpit of the aircraft, an information message relating to the indication and a request for validation from the pilot.

In a preferred embodiment, said reception unit 6, said transcription unit 8, said verification unit 9 and said processing unit 10 form part of a central unit 15 that is for example connected by means of links 7 and 12, respectively, to said radio-communication unit 5 and to said display unit 11.

The processing unit 10 is configured to analyse the textual message (generated by the transcription unit 8 and recorded), first by lexical analysis and then by syntactic analysis, so as to extract the indications contained in said text message.

The indications of the ATC messages are codified according to a particular phraseology so as to be intelligible to the pilots and unambiguous and thus ensure exchanges guaranteeing the safety of the flight. A lexicon illustrating this phraseology is recorded in a database 16 (connected by means of a link 17 to the central unit 15), and the processing unit 10 (of the central unit 15) can thus determine the key words contained in an ATC message received on board the aircraft AC. A structure of the instructions defined by this phraseology is also recorded in the database 16 and allows the processing unit 10 to determine the groups of words associated with a given instruction. It is thus possible to identify the various instructions contained in the message and to interpret each of these instructions with the links between them.

In the conventional fashion, a lexical analysis consists of breaking down a string of characters into lexical units or entities (referred to as "tokens"). These lexical entities are then processed by means of the syntactic analysis. The lexical analysis uses elements contained in the database 16 to type the words. This analysis is done word by word and associates with each word a type (key word associated with a given category, variable value of a given type (for example the time), free text, etc.). In particular, a silence is analysed as a word with a particular type, facilitating analysis of the structure of the message during the syntactic analysis.

Syntactic analysis consists of revealing the structure of a text. The syntactic analyser ("parser") is the computer program that performs this task. This operation assumes formalisation of the text, which is usually seen as an element of a formal language, defined by a set of syntax rules forming a formal grammar. The structure revealed by the syntactic analysis therefore gives precisely the way in which the syntax rules are combined in the text. Syntactic analysis uses information contained in the database 16, defining the grammar (the structure of the global text and of each category).

Moreover, the processing unit 10 is configured to identify, for each indication, at least one system of the aircraft AC able to use this indication.

More precisely, the systems of the aircraft AC concerned, which are shown (schematically and in general) by a set 14 of systems S1 to SN in FIG. 1, N being an integer, correspond: for each instruction extracted, to at least one system (or control unit) of the aircraft AC able to implement this instruction; and for each item of information extracted, to at least one display unit of the aircraft AC able to display this information on a screen in the cockpit.

More precisely, the systems S1, . . . , SN for executing an indication (in particular an instruction) may in particular be: a flight control system, for a heading, speed or altitude instruction; a flight management system FMS, for an instruction modifying the flight path or flight plan; a system for managing communications, and in particular an RMP system for modifying the setting of the listening frequencies for an instruction requesting a change of frequency; and a display unit of the aircraft, of the various types, HUD, PFD and ND, for displaying information.

Moreover, said device 1 comprises in addition a data transmission unit 18 that is configured to transit, via a conventional data transmission link 19, one or more orders to the systems S1 to SN in the set 14, namely orders of the type ordering execution of an instruction by a system (or a control unit) or the display of an item of information on a screen.

The display used by the display unit 11 on the screen 13 consists: for an indication corresponding to an instruction, of displaying the instruction that is to be executed by a system S1, . . . , SN of the aircraft AC and a request for validation or confirmation (by the pilot) of the execution of this instruction by this system S1, . . . , SN; and for an indication corresponding to an item of information, of displaying the information and a request for validation or confirmation of the reading of this information by the pilot.

In addition, the central unit 15 makes provision: for an indication corresponding to an instruction, in the event of validation by the pilot (via a validation unit 20 specified below), to cancel the display of the instruction and actuate the system so that it executes this instruction; and for an indication corresponding to an item of information, in the event of validation by the pilot, for cancelling the display of the information.

The cancelling of the display of an instruction or of an item of information may thus be immediate, as soon as the pilot validates. However, in particular depending on the indication concerned, this cancellation may also be carried out subsequently. For example, for a deferred instruction or a conditional instruction, the instruction remains displayed: for a deferred instruction (which is executed when a first instruction is implemented), preferably as long as this first instruction has not been implemented; and for a conditional instruction (which is executed when particular execution conditions are fulfilled) preferably as long as these particular execution conditions are not fulfilled.

This deferred cancellation secures the execution of an instruction by ensuring that the pilot knows the instruction at the time of the execution thereof.

Moreover, if the processing unit 10 is not able to determine a system that is to execute an instruction, a message indicating that this is impossible is displayed on at least one screen in the cockpit of the aircraft AC, for example on the screen 13 of the display unit 11.

The execution of indications, and in particular of instructions, intended for the aircraft AC is therefore managed automatically by the device 1, and the pilot is thus relieved of many tasks. The central unit 15 recovers an instruction in effect automatically, automatically identifies the system S1, . . . , SN of the aircraft AC, able to implement the instruction, and implements the instruction by automatically giving a command to this system S1, . . . , SN.

The device 1 also increases safety. This is because, with the conventional management of ATC audio messages, when the pilot himself executes instructions or manually enters instructions in suitable devices, he may make an entry error. In addition, it may happen that the pilot misunderstands or does not hear the message or does not identify that the message is being addressed to him. This effect may be amplified in a stress situation or a situation of high workload, in particular when the attention of the pilot is focused on current tasks. The device 1 remedies these drawbacks and ensures robust exchanges with air traffic control allowing the crew to focus solely on the messages that concern them, by facilitating the capture and storage of the instructions and/or information when the message contains a plurality thereof.

Said device 1 also comprises the validation unit 20 which, in a particular embodiment, comprises a dedicated unit 20A. This unit 20A is connected to the central unit 15 by means of a link 21 and is configured to allow a pilot to validate (by command or actuation of a suitable control element) the execution of an instruction by a system and/or the reading of an item of information. This unit 20A may comprise in particular: a manual actuation means, such as a mouse or a control ball of the KCCU type; and/or a voice recognition means, the command being actuated at the time of voice recognition of a word pronounced by a pilot, which forms part of a previously defined database of words.

In a preferred embodiment 20B, said validation unit 20 is associated with a touch screen, for example with the screen 13. In this preferred embodiment, a validation request is displayed on a touch-sensitive window 26 (FIG. 1) of the touch screen, and the validation is implemented by a contact by the pilot (finger contact or using a suitable conventional means) on this window 26 of the touch screen. This request for validation comprises, in a particular embodiment, the display of a text requesting confirmation of an instruction or item of information, as well as this instruction or information, which is also reproduced in the window 26.

In a particular embodiment, said device 1 comprises, in addition: at least one database 22 that is connected by means of a link 23 to the central unit 15 and comprises frequencies of transmitters of audio air traffic control messages, associated with geographical positions; and a conventional unit 24 for determining the current geographical position of the aircraft AC, which is connected by means of a link 25 to the central unit 15 and comprises in particular a GPS receiver. In the conventional fashion, the current geographical position of the aircraft AC can be determined from GPS data and/or inertial data (from on-board inertial units).

In a particular embodiment, the device 1 is also configured to determine an ATC zone in which the current position of the aircraft AC is situated, determined by means of the unit 24. An ATC zone is a predetermined geographical area in which air traffic control is carried out by at least one given air traffic control station, which issues audio air traffic control messages on one or more given frequencies.

In the context of the present disclosure, database means any memory in the aircraft AC to which the central unit 15 has access in order to receive information contained in the memory.

Moreover, said verification unit 9 is configured: to receive the following information: a first frequency corresponding to a listening frequency of the radio-communication unit 5 at which the audio message was received. This frequency may be received via the link 7 of the radio-communication unit 5 or from a communication system that manages the on-board communications and in particular those made via the unit 5; and the current geographical position of the aircraft AC, determined by means of the unit 24; and to perform the following operations:

from the current geographical position of the aircraft AC and the database 22 containing frequencies of transmitters of audio air traffic control messages (associated with geographical positions), determining a set of frequencies associated with an ATC zone in which the current geographical position of the aircraft AC is situated; and comparing the first frequency with each of the frequencies in the set of frequencies and, if the first frequency is identical to one of the frequencies in the set of frequencies, deducing therefrom that the audio message is liable to be intended for the aircraft AC.

In addition, if the audio message is liable to be intended for the aircraft AC, said verification unit 9 is configured to implement the following (supplementary successive) sub-steps: extracting from the audio message the string of characters representing the code designating the aircraft for which the message is intended; comparing this code thus extracted with the code designating the aircraft AC; and determining that the audio message is intended for said aircraft AC if these codes are identical.

The device 1 remains continuously switched on during the flight of the aircraft AC. It is also switched to the ground, since it might receive audio messages coming in particular from the control tower. Listening is therefore continuous. It is known in addition that an aircraft may be listening on a plurality of frequencies simultaneously, in order to listen to the air traffic control ATC, but also an emergency frequency, an ATIS service, other aircraft, a company operations centre, a maintenance centre, a medical centre, etc. Thus, in order to analyse only the ATC messages, when the radio-communication unit 5 communicates an audio message sent by the transmitter 2 on a frequency (for example VHF1) to which said radio-communication unit 5 is connected, the central unit 15 determines, via the unit 24, the current geographical position of the aircraft AC (in latitude, longitude and altitude) and, with a table of frequencies recorded in the database 22, determines whether this frequency (VHF1) corresponds to an ATC frequency of the ATC zone in which the current geographical position of the aircraft AC is situated (on the ground or in flight). To do this, the table of frequencies comprises the ATC frequencies of the various ATC zones, and the central unit 15 determines the ATC zone in which the current geographical position of the aircraft AC is situated, determines all the frequencies associated with this ATC zone and compares the frequency (VHF1) relating to listening to the set of frequencies in order to check whether it corresponds to one of them. The three dimensions of the geographical position of the aircraft AC (that is to say the latitude, longitude and altitude when the position of the aircraft AC is determined from GPS data) are used since the control zones are defined by volumes. At a given latitude and longitude, the aircraft AC may in fact belong to different control zones depending on the altitude of the aircraft AC.

In addition, this determination by comparing positions and frequencies remedies the absence of the air traffic control code ATC in some ATC messages.

The aircraft AC may also be listening on two frequencies associated with different ATC zones. The device 1 automatically determines the air traffic control ATC (which delivers a message in the case where the message transmitted does not contain the code) and informs the pilot. Thus the pilot is informed of the frequency on which he must provide a response.

Furthermore, as the aircraft AC may pass over a following zone while the radio-communication unit 5 is still tuned to the frequency of the previous zone, a margin (for the change of frequency) may be provided when passing between two successive zones or a frequency change instruction may be monitored.

Moreover, in a particular embodiment, the processing unit 10 is configured to perform an operation of consolidation of an indication according to at least one of the following consolidation elements: the context of the aircraft AC and the location of the aircraft AC. In the present disclosure, context means, in general terms, the situation of the aircraft AC in flight, this situation being in particular able to represent a flight phase (descent, approach, cruising, etc.) of the aircraft AC or a particular flight manoeuvre, such as a descent or climb manoeuvre, for example between two flight levels. This consolidation operation consists of: checking the validity of the indication according to at least one consolidation element; and in the event of a validity problem vis-à-vis the consolidation element, checking the presence or absence of an inconsistency of the indication with respect to the consolidation element, and: in the event of absence of inconsistency, correcting the indication; and in the event of the presence of an inconsistency, displaying a message of inability to interpret the indication.

Furthermore, in a particular variant, to check the validity of the indication, the value of a variable element of the indication is compared with a current value of this element.

In a preferred embodiment, in order to correct an indication, the device 1 determines a correction proposal, presents it to the pilot along with a request for validation of this proposal, and makes the correction, in accordance with this correction proposal, only in the event of validation by the pilot.

The content of a message may therefore be the subject of a consolidation depending on the location of the aircraft AC in order to check validity or to correct variable elements of the instruction. Thus, by way of illustration, in the case of an instruction of the "fly direct to TOTO" type, TOTO being a waypoint, the central unit 15 takes account of the location of the aircraft AC in order to check in a database (for example in the database 22) the presence of a waypoint "TOTO" in an area around the current position of the aircraft AC received from the unit 24.

In this example, a plurality of cases is possible: the waypoint "TOTO" exists in the database 22 and the central unit 15 confirms the transcription made by the transcription unit 8; the waypoint "TOTO" does not exist in the database 22 and the central unit 15 identifies in the database 22 a waypoint with a similar name (for example "TOTON"). The central unit 15 then replaces the waypoint "TOTO" with the waypoint "TOTON" and optionally indicates this approximation to the pilot; and in all other cases, the central unit 15 declares itself unable to interpret the instruction.

When the central unit 15 declares itself unable to interpret an instruction (or to identify a dedicated system), the device 1 displays a corresponding inability message on a screen, for example on the screen 13.

Figure 3:
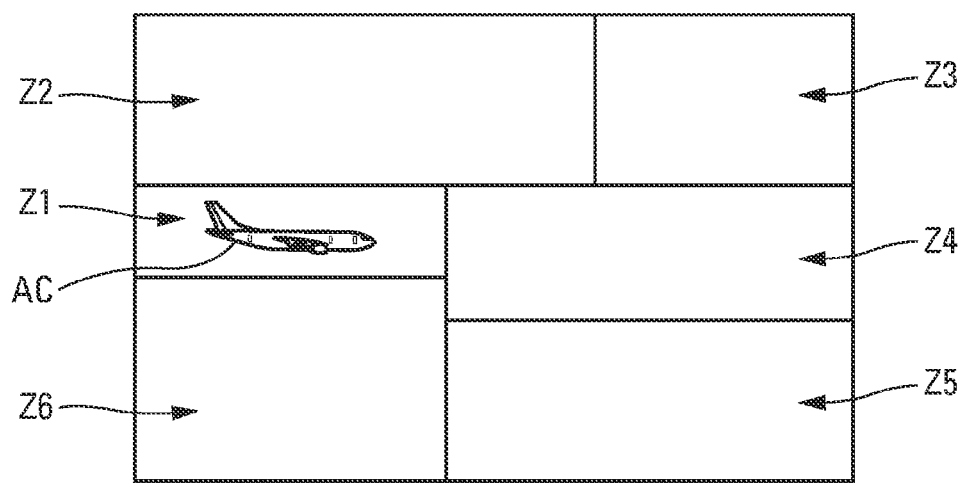
FIG. 3 illustrates schematically various air traffic control zones around the position of the aircraft.

The same type of consolidation can be effected by using the geographical location of the aircraft AC not only in a horizontal plane but also in a vertical plane, taking into account zones Z1 to Z6, as depicted in FIG. 3. These zones Z1 to Z6 are defined in a database, for example in the database 22. Thus, in the case of an ATC message of the "contact next zone, 123.5" type, the central unit 15 considers the control zones Z2, Z4, Z5, Z6 adjacent to the zone Z1 in which the aircraft AC is situated, as depicted in FIG. 3, and compares the ATC frequencies with the frequency of the message.

The consolidation may also take account of the context of the aircraft AC in order to target the checks to be made. Thus, in the case where the aircraft AC is climbing (or respectively descending), the control zone adjacent to the current zone Z1 is the zone Z2 (or respectively the zone Z4 or Z5).

By way of illustration of the consolidation by the context of the aircraft, it is considered that the aircraft AC is descending and receives an instruction of the "AAA to FL300" type, where AAA is a fixed element of the instruction that is either "descend" or "climb", or any other string of characters that might have been poorly transcribed. Furthermore, FL300 (namely the flight level) is a variable element of this instruction. Thus: if the fixed element of the instruction is "descend", the central unit 15 takes account of the fact that the aircraft AC is descending and confirms the interpretation of the fixed element; if the fixed element is "climb", the central unit 15 takes account of the fact that the aircraft AC is descending and detects an inconsistency between the instruction and the context. The central unit 15 declares itself unable to interpret the instruction; and if the fixed element is an indeterminate word, the central unit 15 takes account of the fact that the aircraft AC is descending and corrects the instruction by replacing said word by "descend".

Furthermore, in a particular embodiment, in a variant of or in addition to the aforementioned consolidation, a consolidation may be made on the variable element (FL300) of the instruction. Thus, if it is for example considered that the current altitude of the descending aircraft AC, receiving the instruction "descend to FL300": is FL350, the central unit 15 confirms the interpretation of the variable element; and is FL250, the central unit 15 detects an inconsistency between the instruction and the context and declares itself unable to interpret the instruction.

This consolidation may be extended by comparing the message received with a list of relevant messages for a given flight phase or a particular manoeuvre.

Figure 4:
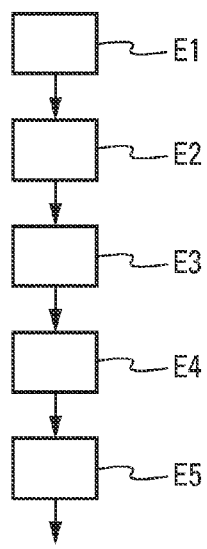
FIG. 4 illustrates schematically a series of successive main steps implemented by an automatic management device.
Figure 7:
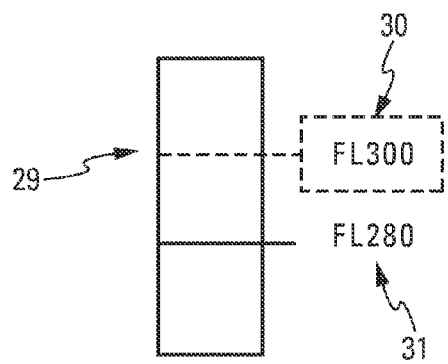
FIG. 7 is an altitude scale relating to an exemplary embodiment.

Using the device 1, as described above, the audio messages are managed according to the following general steps E1 to E5, shown in FIG. 4: At E1, the device 1 receives all the audio messages listened to by the pilot via the radio-communication unit 5 (on a given listening frequency). At E2, the device 1 detects, among all the messages transmitted over the listening frequency, any message that is intended for the aircraft AC. At E3, the device 1 processes each message intended for the aircraft AC, extracting the indications from the message. At E4 the device 1 produces a display for the pilot relating to each indication extracted. For each indication corresponding to an instruction, the device 1 requests the pilot to validate the execution of the instruction by one or more suitable systems S1, . . . , SN. and at E5, after validation by the pilot, the device 1 sends an order to execute the instructions to each of said systems S1, . . . , SN, said systems S1, . . . , SN carrying out the execution according to said instructions.

In addition, the pilot confirms to the air traffic control, in the conventional way, correct understanding of the instructions.

Two examples of different indications are presented below in order to explain possible implementations of the illustrated embodiments, namely: a first example, for which the aircraft AC is in flight and the ATC control requests the pilot of the aircraft AC to confirm that he can indeed see another aircraft in a given direction and at a given distance; and a second example, for which the aircraft AC is on the ground and has to taxi to a given runway.

In the first example, the aircraft AC receives an ATC message of the type: "A222, confirm you see B709, 12 o'clock, 5000 ft above your position". In this case, the central unit 15 does not detect an instruction that can be executed by a system of the aircraft AC. For safety reasons, the central unit 15 therefore orders that the system able to execute the information is a display screen in the cockpit, forming part of the assembly 14. The central unit 15 automatically transmits the information in the form of a textual message that is displayed in a window of this display screen, in particular a text of the type "From ATC: confirm you see B709, 12 o'clock, 5000 ft above your position".

A similar case occurs whenever the central unit 15 is not able to determine which system can execute an instruction. In this case, no confirmation (or validation) of execution is requested of the pilot. An action by the pilot (touching the display area if the screen is a touch screen) shows that the pilot has received the information and the display area disappears.

In the previous example, the pilot indicates to the ATC control whether or not he can see the aircraft. The presence of the window on the display screen, for example the window 26 on the screen 13, repeating the message from the ATC, alerts the pilot that an ATC message concerning the aircraft AC has been received and must be dealt with.

In the second example, the aircraft AC is taxiing on the ground at an airport, with a view to take-off. It was initially to taxi to a runway threshold 14L, passing along taxiways P70 and N8 indicated by a path T0 on the various displays dedicated to the representation of the path (HUD, ND), as shown in FIG. 5 illustrating a portion 27 of a screen displaying a plan view of part of the airport with a symbol 28 illustrating the current position of the aircraft AC.

Because of an obstruction 29 on the taxiway N8, for example a broken down aircraft, the ATC control sends the following message: "A222, runway change 14 right, continue taxi on Papa 70 and Mike 10". The central unit 15 of the device 1 of the aircraft AC (with the code A222) detects the instructions and considers that the system to be controlled is a display screen of the HUD and ND type. An analysis of a database, for example the database 22, in which the airport taxiways are recorded, makes it possible to find the line of the new path T1 (along P70 and M10 as far as 14R). Thus the central unit 15 calculates the new path T1 and orders the display of this new path T1.

Figure 5:
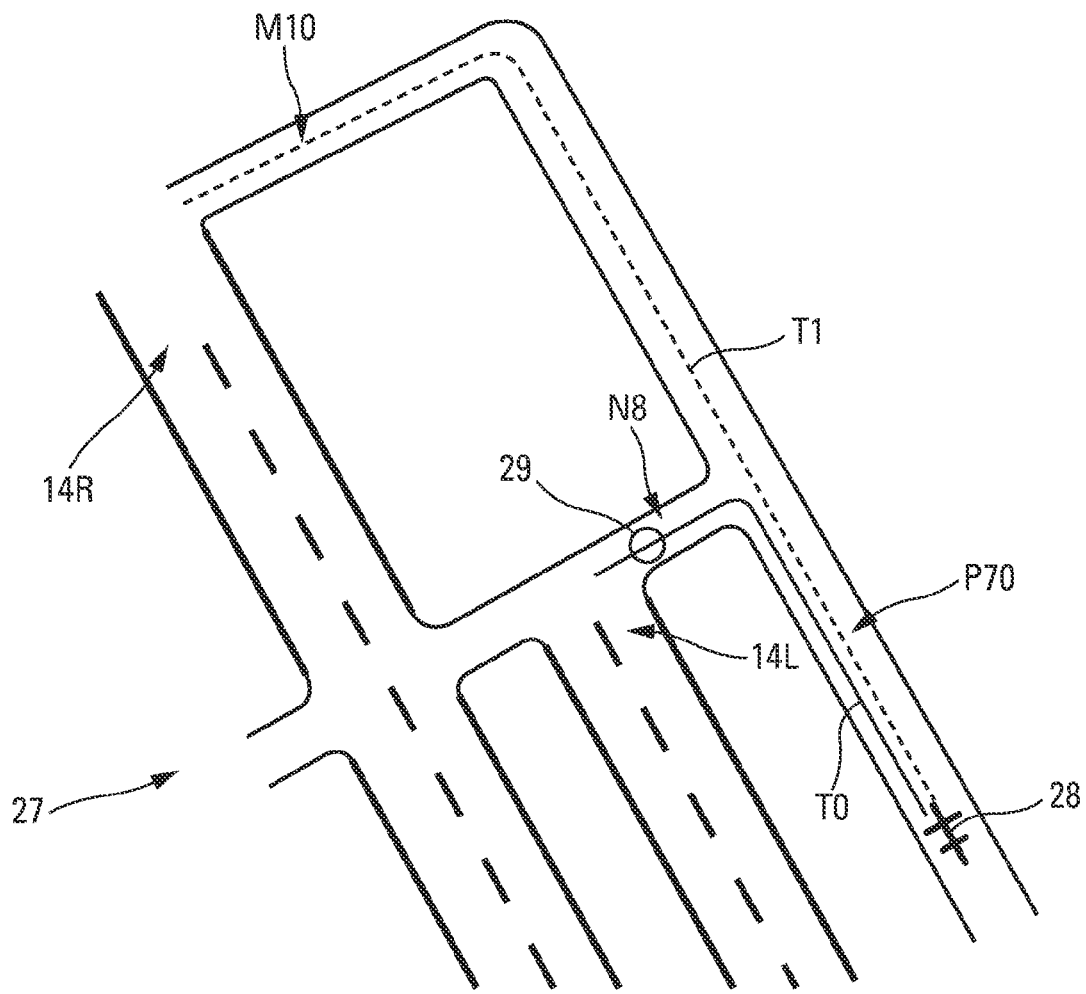
FIG. 5 shows schematically the display of part of an airport illustrating an exemplary embodiment.

In this case, the central unit 15 is configured to modify the display of the corresponding screen in order to show the new path T1 (as depicted in dashes in FIG. 5).

For reasons of safety, the pilot must confirm the intentions of the central unit 15. For this purpose, a window is displayed on a display screen, for example the window 26 on the screen 13, summarising the intentions of the central unit 15. An action by the pilot (if the screen is a touch screen, touching a suitable display area, from two areas having the words "yes" and "no") allows the pilot to validate the instruction. If the instruction is validated, the central unit 15 changes the path from T0 to T1 on the screen.

Figure 6:
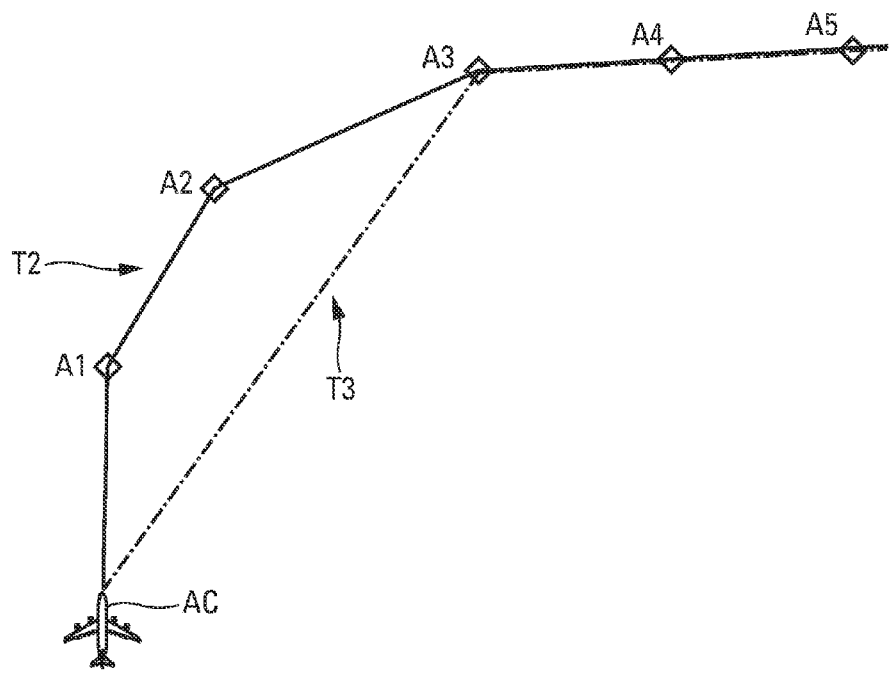
FIG. 6 shows schematically a flight path change illustrating an exemplary embodiment.

The device 1, as described above, may receive very many different ATC messages. By way of illustration, the following ATC messages can in particular be cited: Message A is an ATC message comprising an expression of the type "contact next zone, 123.6". This ATC message is interpreted by the central unit 15 as concerning a system for managing the communications of the aircraft AC. The frequency supplied by the message is selected as a standby frequency that the pilot must confirm for replacing the current frequency on which the message was received. Message B is an ATC message comprising an expression of the type "squawk 3546". This ATC message is interpreted by the central unit 15 as concerning a transponder of the aircraft AC. The transponder code is modified by the new value after confirmation by the pilot. Message C is an ATC message comprising an expression of the type "fly direct to A3". This ATC message is interpreted by the central unit 15 as concerning a system for managing the flight plan of the aircraft AC. The aircraft AC flies along a path T2 passing through successive waypoints A1 to A5, depicted in the form of a continuous line in FIG. 6. The instruction is taken into account in the form of a path T3 (depicted by a dot-and-dash line in FIG. 6), which provides a direct flight from the current position of the aircraft AC to a waypoint A3. The pilot must confirm this new path T3 before it becomes active and before the aircraft AC is guided on this path T3 (having become active). Message D is an ATC message comprising an expression of the type "expect runway change ILS15R, STAR Z". This ATC message is interpreted by the central unit 15 as concerning the system managing the flight plan. In this particular case, the flight plan management system interprets the term "expect" by constructing an auxiliary path that the pilot will be able to store in order to use if the change of runway becomes effective. Message E is an ATC message comprising an expression of the type "climb to FL300". This ATC message is interpreted by the central unit 15 as concerning a system for controlling the flight of the aircraft AC. The new altitude (FL300) contained in the message is presented on an altitude scale 29 with a specific depiction 30 for displaying this value, in addition to a conventional depiction 31 indicating the current altitude (FL280), as shown in FIG. 6. This new altitude (FL300) contained in the message is presented before confirmation by the pilot and activation by the device 1. Finally, Message F is an ATC message comprising an expression of the type "fly direct to A3, then climb to FL300". This ATC message is interpreted as consisting of two instructions, the second having to be executed once the first is implemented. The second instruction is indicated in such a way as to show that it is indeed taken into account by the central unit 15 but that it will be actuated subsequently. This instruction is stored until the waypoint A3 is reached. When the aircraft AC reaches A3, the instruction that is still to be implemented is repeated to the pilot and indicated on an altitude scale. The pilot must confirm in order to validate the new altitude target. This feature also applies to messages of the type "at A3, climb to FL300" or of the type "report altitude at A3", which requests the pilot to call air traffic control once he has arrived at A3 and to indicate his current altitude.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A method for automatically managing audio air traffic control messages on board an aircraft transmitted by a transmitter of an air traffic controller and received on board the aircraft by means of at least one radio-communication unit, an audio message comprising at least one indication intended for the aircraft and corresponding to one of the following indications: an instruction that has to be executed on the aircraft and information that is to be communicated to a pilot of the aircraft, said method comprising:
   (a) transcribing the audio message received into a textual message;
   (b) checking that the audio message received is intended for said aircraft;
   (c) if the audio message is intended for the aircraft, processing the textual message corresponding to the audio message so as to extract all the indications contained in said audio message; and
   (d) for each of the indications thus extracted, displaying, on at least one screen in the aircraft cockpit, an information message relating to the indication and a request for validation by the pilot, wherein step (b) comprises:
   determining at least one first frequency corresponding to a listening frequency of the radio-communication unit, at which it received the audio message;
   determining the current geographical position of the aircraft;
   from the current geographical position of the aircraft and a database comprising frequencies of transmitters of audio air traffic control messages associated with geographical positions, determining a set of frequencies associated with a zone in which the current geographical position of the aircraft is situated; and
   comparing the first frequency with each of the frequencies in the set of frequencies and, if the first frequency is identical to one of the frequencies in the set of frequencies, deducing from this that the audio message is liable to be intended for the aircraft,
and wherein step (b) further comprises, if the audio message is liable to be intended for the aircraft, said aircraft being designated by a first code, of:
   extracting from the audio message a string of characters representing a second code;
   comparing the second code thus extracted with the first code designating the aircraft; and
   determining that the audio message is intended for the aircraft if the first and second codes are identical.

2. The method according to claim 1, wherein step c) comprises successive sub-steps consisting respectively of:
   (c1) analysing the textual message, first of all by lexical analysis and then by syntactic analysis, so as to extract the indications contained in said textual message; and
   (c2) identifying:
      for each instruction extracted, at least one system of the aircraft configured to execute this instruction; and
      for each item of information extracted, at least one display unit of the aircraft configured to display this information.

3. The method according to claim 2, wherein step (d) comprises:
   displaying the instruction that is to be executed by a system of the aircraft and a request for validation of the execution of this instruction by this system; and
   in the event of validation by the pilot, actuating the system so that it executes this instruction.

4. The method according to claim 2, wherein step (d) comprises, for an indication corresponding to an item of information, displaying the information and a request for validation of the reading of this information by the pilot.

5. The method according to claim 2, wherein, if at sub-step (c2) it is impossible to determine a system that is to execute an instruction, an information message indicating that this is impossible is displayed on at least one screen in the cockpit of the aircraft.

6. The method according to claim 2, wherein step (c) comprises at least one operation of consolidating an indication according to at least one of the following consolidation elements: a context of the aircraft and a location of the aircraft, the consolidation operation consisting of:
   checking the validity of the indication according to at least one consolidation element; and
   in the event of a validity problem vis-à-vis the consolidation element, checking the presence or absence of an inconsistency in the indication with respect to the consolidation element, and:
      in the event of absence of inconsistency, correcting the indication; and in the event of inconsistency being present, displaying a message of inability to interpret the indication.

7. The method according to claim 6, wherein, in order to correct the indication, the consolidation operation comprises the following sub-steps, consisting of:
proposing a correction of the indication to the pilot;
requesting validation of the correction proposed; and
correcting the indication after validation by the pilot, in accordance with the correction proposed.

8. The method according to claim 6, wherein, in order to check the validity of the indication, the value of a variable element of the indication is compared with a current value of this element.

9. A device for the automatic management on board an aircraft of audio air traffic control messages transmitted by a transmitter of an air traffic controller and received on board the aircraft by means of a radio-communication unit, an audio message comprising at least one indication intended for the aircraft and corresponding to one of the following indications: an instruction that is to be executed on the aircraft and an item of information that is to be communicated to a pilot of the aircraft, said device comprising:
a reception unit configured to automatically capture any audio message received by the radio-communication unit;
a transcription unit configured to automatically transcribe an audio message captured by the reception unit into a textual message;
a verification unit configured so as to automatically check whether the audio message received by means of the radio-communication unit is intended for the aircraft;
a processing unit configured to automatically process the textual message corresponding to the audio message so as to extract all the indications contained in said audio message, and
at least one display unit configured so as to automatically display, for each of the indications extracted, on at least one screen in the cockpit of the aircraft, an information message relating to the indication and a request for validation by the pilot, wherein it further comprises at least one database comprising frequencies of transmitters of audio air traffic control messages associated with geographical positions and a unit for determining the current position of the aircraft, and wherein said verification unit is configured so as to implement successive sub-steps, consisting respectively of:
from the current geographical position of the aircraft and the database comprising the frequencies of transmitters of audio air traffic control messages associated with geographical positions, determining a set of frequencies associated with a zone in which the current geographical position of the aircraft is situated; and
comparing the first frequency with each of the frequencies in the set of frequencies and, if the first frequency is identical to one of the frequencies in the set of frequencies, deducing from this that the audio message is liable to be intended for the aircraft; and
if the audio message is liable to be intended for the aircraft:
extracting from the audio message a string of supplementary characters representing a second code;
comparing the second code thus extracted with a first code designating the aircraft; and
determining that the audio message is intended for the aircraft if the first and second codes are identical.

10. The device according to claim 9, further comprising a data transmission unit configured so as to transmit an execution order to a system of the aircraft ordering the execution of an instruction by said system and/or an order to display on a screen in the cockpit of the aircraft ordering the display of an item of information by said screen.

11. The device according to claim 9, wherein at least said reception unit, said transcription unit, said verification unit and said processing unit form part of a central unit.

12. The device according to claim 9, further comprising at least one database comprising data for performing a lexical analysis and a syntactic analysis of a textual message.

13. The device according to claim 9, further comprising a validation unit configured to allow a pilot to validate the execution of an instruction by a system and/or the reading of an item of information.

14. The device according to claim 13, wherein said validation unit comprises a touch screen, a request for validation being displayed on a touch-sensitive window on the touch screen, the validation being implemented by a contact on this touch-sensitive window of the touch screen.

15. An aircraft, comprising:
a message management device including:
a reception unit configured to automatically capture any audio message received by the radio-communication unit;
a transcription unit configured to automatically transcribe an audio message captured by the reception unit into a textual message;
a verification unit configured so as to automatically check whether the audio message received by means of the radio-communication unit is intended for the aircraft;
a processing unit configured to automatically process the textual message corresponding to the audio message so as to extract all the indications contained in said audio message, and
at least one display unit configured so as to automatically display, for each of the indications extracted, on at least one screen in the cockpit of the aircraft, an information message relating to the indication and a request for validation by the pilot, wherein it further comprises at least one database comprising frequencies of transmitters of audio air traffic control messages associated with geographical positions and a unit for determining the current position of the aircraft, and wherein said verification unit is configured so as to implement successive sub-steps, consisting respectively of:
from the current geographical position of the aircraft and the database comprising the frequencies of transmitters of audio air traffic control messages associated with geographical positions, determining a set of frequencies associated with a zone in which the current geographical position of the aircraft is situated; and
comparing the first frequency with each of the frequencies in the set of frequencies and, if the first frequency is identical to one of the frequencies in the set of frequencies, deducing from this that the audio message is liable to be intended for the aircraft; and
if the audio message is liable to be intended for the aircraft:
extracting from the audio message a string of supplementary characters representing a second code;
comparing the second code thus extracted with a first code designating the aircraft; and
determining that the audio message is intended for the aircraft if the first and second codes are identical.

16. The aircraft according to claim 15, further comprising a data transmission unit configured to transmit at least one of an execution order to a system of the aircraft ordering the execution of an instruction by said system and an order to display on a screen in the cockpit of the aircraft ordering the display of an item of information by said screen.

17. The aircraft according to claim 15, wherein at least said reception unit, said transcription unit, said verification unit, and said processing unit form part of a central unit.

18. The aircraft according to claim 15, further comprising at least one database comprising data for performing a lexical analysis and a syntactic analysis of a textual message.

19. The aircraft according to claim 15, further comprising a validation unit configured to allow a pilot to validate the execution of an instruction by a system and/or the reading of an item of information.

20. The aircraft according to claim 19, wherein said validation unit comprises a touch screen, a request for validation being displayed on a touch-sensitive window on the touch screen, the validation being implemented by a contact on this touch-sensitive window of the touch screen.

* * * * *